United States Patent [19]

Terry et al.

[11] Patent Number: 5,368,721
[45] Date of Patent: Nov. 29, 1994

[54] CATALYTIC CRACKING SYSTEM

[75] Inventors: Patrick H. Terry, Middletown; Gregory S. Sherowski, Whippany, both of N.J.; Philip Holmes, West Horsley, England

[73] Assignee: Exxon Research & Engineering Co., Florham Park, N.J.

[21] Appl. No.: 80,382

[22] Filed: Jun. 21, 1993

[51] Int. Cl.⁵ .............................................. C10G 11/00
[52] U.S. Cl. ................................... 208/146; 208/153; 208/157
[58] Field of Search ............... 208/113, 157, 161, 153, 208/74, 91, 120; 422/140, 113

[56] References Cited

U.S. PATENT DOCUMENTS

| | | | |
|---|---|---|---|
| 3,261,776 | 7/1966 | Baumann et al. | 208/113 |
| 4,043,899 | 8/1977 | Anderson | 208/161 |
| 4,588,558 | 5/1986 | Kam | 422/113 |
| 4,749,471 | 6/1988 | Kam | 208/113 |
| 4,875,994 | 10/1989 | Haddad et al. | 208/113 |

Primary Examiner—Helen M. S. Sneed
Assistant Examiner—Bekir L. Yildirim
Attorney, Agent, or Firm—Richard D. Jordan

[57] ABSTRACT

Disclosed is a system for fluid catalytic cracking. The system includes a method and means for decreasing and increasing the slip velocity of a hydrocarbon reaction stream to further enhance catalytic cracking of the hydrocarbon within the reaction stream. The system also allows for control of residence time within both a riser and a collection and velocity reducing means to provide for more complete cracking of the hydrocarbon without leading to additional coking of the catalytic cracking catalyst.

8 Claims, 2 Drawing Sheets

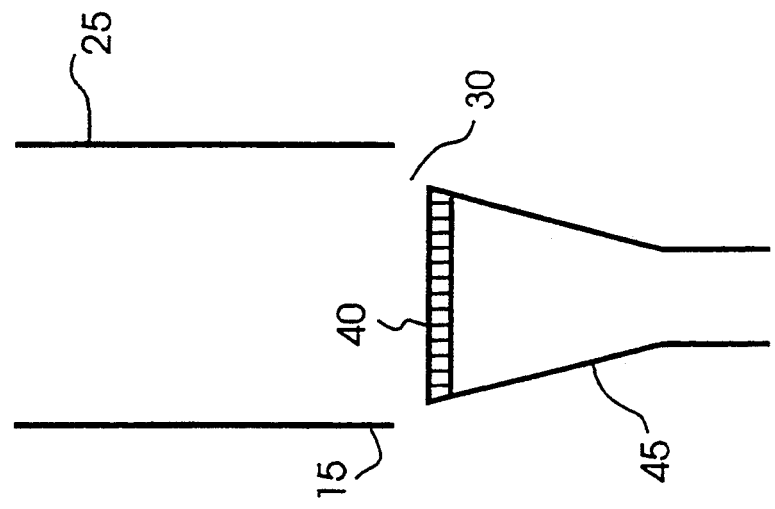
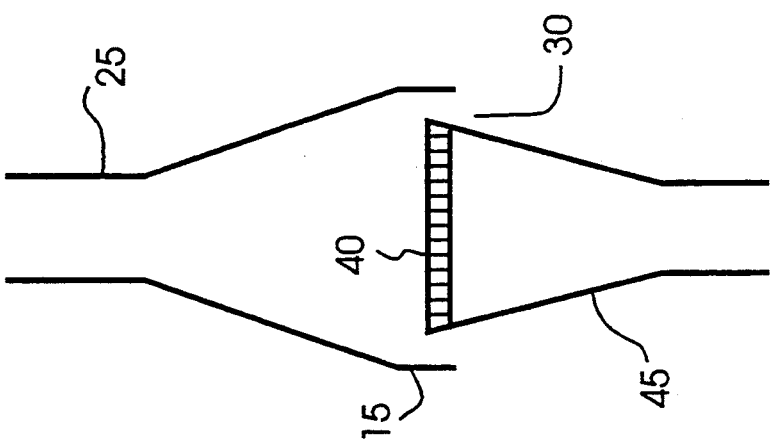
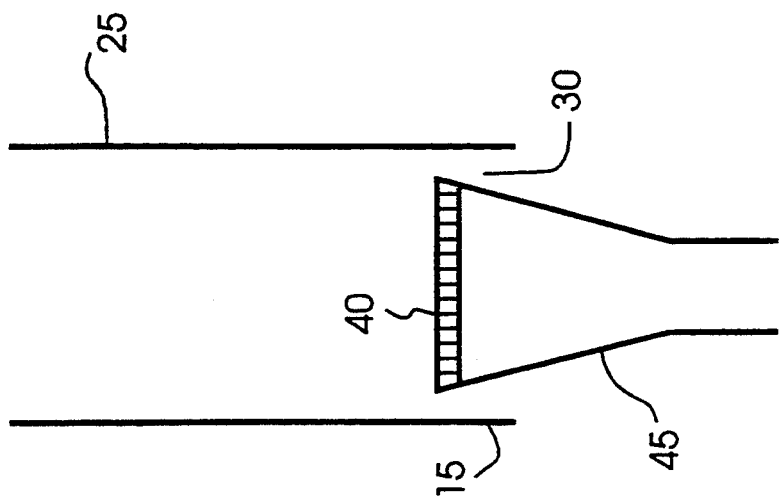

CATALYTIC CRACKING SYSTEM

FIELD OF THE INVENTION

This invention relates to a system for catalytically cracking hydrocarbon using a catalytic cracking catalyst. More particularly, this invention relates to controlling the catalytic cracking of hydrocarbon in a hydrocarbon and catalyst mixture by controlling the velocity of the mixture as it proceeds through the reaction system.

BACKGROUND OF THE INVENTION

In catalytic cracking reaction systems, it is important to maximize contact of hydrocarbon with the catalytic cracking catalyst in order to maximize conversion. However, if contact time is excessive, there will be over-cracking of the hydrocarbon with excessive deposition of carbonaceous material, i.e., coke adheres to the catalyst. If there is excessive coke buildup, regeneration and reuse of the catalyst becomes very difficult.

One method of reducing contact time in a catalytic cracking system is to reduce the cross-sectional area of the system in which the reaction occurs. This reduction in area has been accomplished in closed cyclone systems. In such systems, cyclones are placed within a reaction vessel, and are positioned so that the cyclone inlets maintain direct contact with the hydrocarbon and catalyst mixture.

U.S. Pat. No. 4,043,899 discloses a catalytic cracking system which incorporates a closed cyclone system. In closed cyclone systems like that shown in U.S. Pat. No. 4,043,899, typically about 90% or more of the hydrocarbon flow goes directly from the riser outlet, through the internal reactor cyclones, and to the plenum chamber without going into the reactor vessel itself. Stripout vapors from the stripping section, and any other vapors entrained in the reactor vessel, generally enter the plenum chamber though ports or holes in the cyclone system or there are additional cyclones which are specifically used to capture the entrained vapors.

U.S. Pat. Nos. 4,588,558 and 4,749,471 disclose a closed cyclone system within a catalytic cracking reaction vessel. The closed system shown in these patents incorporates an annulus separating the riser from the collection conduit of the cyclones. The riser and the collection conduit maintain essentially constant dimensions throughout the reaction vessel.

A problem inherent in catalytic cracking systems which incorporate the closed cyclone designs of the prior art is that the hydrocarbon feed and catalytic cracking catalyst are not intensely mixed, resulting in poor contact between hydrocarbon and catalyst. The closed cyclone designs of the prior art are also problematic in that vapors can accumulate in the dilute phase of the reactor vessel, where they remain for an extended period of time. This adversely affects the stripping of hydrocarbon entrained in the catalyst, product yield and overall product quality. It is, therefore, an object of this invention to overcome many of the problems inherent in known catalytic cracking systems.

SUMMARY OF THE INVENTION

In order to overcome problems inherent in the prior art, the present invention provides a catalytic cracking process which comprises providing a feed stream of hydrocarbon and catalytic cracking catalyst; catalytically cracking the hydrocarbon with the catalytic cracking catalyst to form a reaction stream having a relatively constant velocity, wherein the reaction stream comprises a mixture of hydrocarbon, cracked hydrocarbon and catalytic cracking catalyst; decreasing the velocity of the reaction stream to form a reaction stream having a negative slip velocity; increasing the velocity of the negative slip velocity reaction stream to form a reaction stream having a positive slip velocity; collecting tile positive slip velocity reaction stream; reducing the slip velocity of the positive slip velocity reaction stream to crack the hydrocarbon with the catalytic cracking catalyst; and separating and recovering the cracked hydrocarbon.

The invention also provides for a continuous catalytic cracking process which comprises continuously providing a feed stream which comprises hydrocarbon and catalytic cracking catalyst; catalytically cracking the hydrocarbon with the catalytic cracking catalyst to form a reaction stream which comprises a mixture of hydrocarbon, cracked hydrocarbon and catalytic cracking catalyst, wherein the reaction stream has a relatively constant velocity; decreasing the velocity of the reaction stream to form a reaction stream having a negative slip velocity; increasing the velocity of the negative slip velocity reaction stream to form a reaction stream having a positive slip velocity; collecting the positive slip velocity reaction stream; reducing the slip velocity of the positive slip velocity reaction stream to crack the hydrocarbon with the catalytic cracking catalyst; separating and recovering the cracked hydrocarbon; stripping entrained hydrocarbon from the catalytic cracking catalyst; and combining the stripped hydrocarbon with the positive slip velocity reaction stream.

BRIEF DESCRIPTION OF THE DRAWINGS

The present invention will be better understood by reference to the Description of the Preferred Embodiments when taken together with the attached drawings, wherein:

FIGS. 2A–C show preferred embodiments of collection and velocity reducing means for collecting and reducing the slip velocity of the reaction stream from the riser outlet.

DESCRIPTION OF THE PREFERRED EMBODIMENTS

Figure 1:
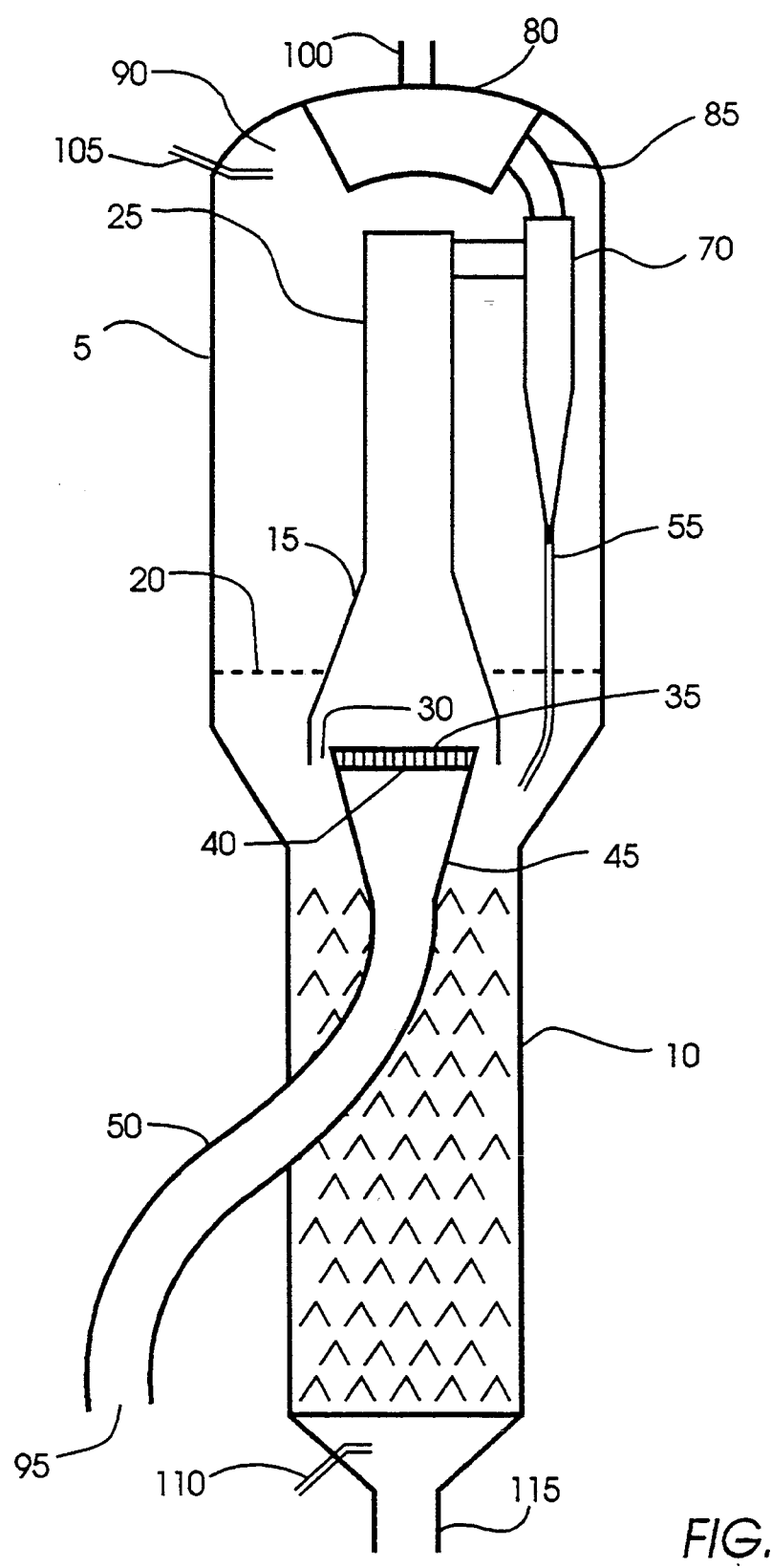
FIG. 1 shows a preferred embodiment of the catalytic cracking system which incorporates a lip velocity increasing means and a slip velocity decreasing means.

The preferred embodiments of this invention will be described with reference to the drawings. The drawings provide illustrated support for the description of the preferred embodiments and are not to be used to further limit the invention from what is claimed. Unless otherwise stated, the term velocity refers to average velocity.

FIG. 1 shows a preferred embodiment of the catalytic cracking system of this invention. The catalytic cracking system includes a reaction vessel 5 and a stripping means 10. A feedstream is fed to the catalytic cracking system through a riser 50 having a riser inlet 95 and a riser outlet 35-110. The feedstream includes a mixture of hydrocarbon and catalytic cracking catalyst, which is used to control the cracking of the hydrocarbon.

Hydrocarbon cracking is a term which is well known in the art of petroleum refining and generally refers to the cracking of a large hydrocarbon molecule to a smaller hydrocarbon molecule by breaking at least one carbon to carbon bond. For example, large paraffin molecules can be cracked to a paraffin and an olefin, and a large olefin molecule can be cracked to two or more smaller olefin molecules. Long side chain molecules which may be present on aromatic rings or naphthenic rings can also be cracked. It is preferred in this invention that the hydrocarbon comprise a petroleum distillate, more preferably a petroleum distillate which boils at 600°–1100° F. Heavy residuum can also be present in the distillate.

As known in the art, catalytic cracking catalyst can be used to catalytically control a hydrocarbon cracking reaction. However, thermal cracking reactions also occur within the system. In addition, numerous side reactions accompany the cracking reactions. Other reactions include dehydrogenation, cyclization, oligomerization, polymerization, hydrogen transfer and coke formation on the catalyst. The result of a controlled catalytic cracking reaction is that a reaction stream is formed which is predominantly a mixture of hydrocarbon, cracked hydrocarbon and catalytic cracking catalyst. However, due to the numerous side reactions that inherently take place in a hydrocarbon cracking reaction, a small amount of other products will also be present. The catalytic cracking catalyst can also be partially or completely coked, depending upon the extent of the side reactions.

It is preferred that the catalytic cracking catalyst of this invention be any of the known catalysts which can be used in a fluid catalytic cracking unit (FCCU). Preferably, the catalyst will be a high activity crystalline zeolite, which is known in the art.

The hydrocarbon which is introduced into the riser 50 can be in liquid form but substantially vaporizes once inside the riser. Vaporization may not be complete, however, if high boiling feeds are used, large liquid droplets are present in the feed, or liquid feed forms agglomerates with the catalyst. Once the hydrocarbon vaporizes and mixes with the catalytic cracking catalyst, a fluid like suspension is formed. As the suspension moves through the riser, most of the hydrocarbon is cracked, forming a reaction stream as defined above.

Preferably, the hydrocarbon in the riser is cracked at a temperature of about 800°–1200° F, more preferably from about 850°–1050° F. In general, from about 70–95% of the hydrocarbon is cracked into cracked hydrocarbon within the riser. Preferably, about 90% of the hydrocarbon will be cracked within the riser.

The extent of cracking within the riser will not only be controlled by temperature but also by residence time. The residence time of the hydrocarbon and catalytic cracking catalyst within the riser will typically be about 2–10 seconds, preferably about 3–5 seconds.

The reaction stream desirably moves through the riser 50 at a relatively constant velocity, preferably about 30–100 ft/sec. As the reaction stream moves through the riser 50, it encounters a slip velocity decreasing means 45, which acts to significantly decrease the velocity of the vapor component in the reaction stream relative to the velocity of the catalyst component. The difference between these velocities is gauged in terms of slip velocity, where slip velocity is defined as the velocity of the vapor portion of the reaction stream minus the velocity of the catalyst portion of the reaction stream.

After encountering the slip velocity decreasing means 45, the velocity of the reaction stream is decreased such that a reaction stream is formed which has a negative slip velocity. This negative slip velocity reaction stream preferably has a slip velocity of between about negative 10 and negative 50 ft/sec, more preferably between about negative 15 and negative 30 ft/sec.

One way of forming a negative slip velocity reaction stream is to provide an expansion means prior to the riser exit. The expansion means can be of any shape, although a conical expansion means is preferred due to the relative simplicity of construction. The preferred parameters can be attained using a conical expansion means having an angle of less than about 30 degrees, with the angle measured from the riser projection. More preferably, the conical expansion means will have an angle of about 5–10 degrees. It is also preferable that the conical expansion means have a maximum diameter of about 1.2–2.5 times the diameter of the riser. Preferably, the desired slip velocity will be attained within about 0.05–5 seconds, more preferably about 0.1–0.2 seconds.

After the reaction stream passes across the slip velocity decreasing means 45, a slip velocity increasing means 40 is encountered. The slip velocity increasing means 40 will be displaced from the velocity decreasing means 45, further defining the riser outlet 35. The slip velocity increasing means 40 increases both the average and slip velocity of the negative slip velocity reaction stream. In addition, the slip velocity increasing means 40 promotes intense mixing of the components within the reaction stream. The intense mixing is reflected by a high positive slip velocity that develops as the negative slip velocity reaction stream passes across the slip velocity increasing means 40. As the reaction stream is accelerated across the slip velocity increasing means 40, the velocity of the vapor portion of the reaction stream is significantly increased, while the velocity of the catalyst in the reaction stream is only slightly affected.

Not only does a high positive slip velocity provide intense mixing of components in the reaction stream, but developing a negative slip velocity prior to forming a high positive slip velocity will enhance the breaking up of large catalyst clusters and large droplets of unreacted hydrocarbon to further promote the catalytic cracking reaction. Preferably, the slip velocity increasing means 40 will provide a positive slip velocity of about 50–285 ft/sec. More preferably, the velocity increasing means 40 will provide a positive slip velocity of about 100–160 ft/sec.

In a preferred embodiment, the slip velocity increasing means 40 is a grid plate, which contains at least one hole. Each hole will function as an orifice, creating flow constriction, and causing an increase in the slip velocity of the reaction stream. The means defining each hole can be of any shape such as a means having a round, square edge shape, a means having a round, flow nozzle shape, or a venturi shaped means.

Following the slip velocity increasing means 40, the positive slip velocity reaction stream is collected and the velocity is reduced by a collection and velocity reducing means 15. Within the collection and velocity reducing means 15, the high positive slip velocity of the positive slip velocity reaction stream will be reduced such that the catalytic cracking catalyst and the unreacted hydrocarbon optimally recontact one another and the catalytic cracking reaction is continued. The reduction in positive slip velocity is determined according to the extent of catalytic cracking that is desired. Preferably, the positive slip velocity of the reaction stream will be reduced to achieve a reaction time of about 0.1–3.0 seconds within the collection means 15. More preferably, the reaction stream will be reduced to achieve a reaction time of about 0.4–1.0 seconds within the collection means 15. This will preferably result in a slip velocity of about 1–20 ft/sec within the collection and velocity reducing means 15, more preferably about 2–10 ft/sec.

The extent of cracking within the collection and velocity reducing means 15 can also be controlled by temperature as well as residence time. It is preferable, however, that the temperature within the collection means approximate that within the riser 50.

The collection and velocity reducing means 15 can also include a conduit 25 which is connected to a cyclone 70. The connection between conduit 25 and cyclone 70 forms a closed cyclone system within the reaction vessel 5.

The collection and velocity reducing means 15 can be of any shape. However, in a preferred embodiment, the inlet to the collection and velocity reducing means 15 has a cross-sectional area that is greater than the cross-sectional area of the slip velocity increasing means 40. In another preferred embodiment, the inlet to the collection and velocity reducing means 15 forms a reduction cone such that the cross-sectional area of conduit 25 is less than the maximum cross-sectional area of the inlet. The cross-sectional area of the conduit 25 can vary to achieve the desired residence time within the collection and velocity reducing means 15.

A substantial portion of the cracked hydrocarbon, as well as a substantial portion of all the vapor components in the reaction stream, is separated from the reaction stream by the cyclone 70. The cracked hydrocarbon exits the cyclone 70 through a cyclone outlet 85 and accumulates in a plenum chamber 80. The cracked hydrocarbon is recovered from the reaction vessel through a plenum chamber outlet 100.

After the cracked hydrocarbon and other vapor components have been separated from the reaction stream cyclone 70, the remainder of the reaction stream exits from the cyclone 70 through a cyclone dipleg 65. The remainder of the reaction stream which exits by way of the cyclone dipleg 65 is predominantly catalytic cracking catalyst with entrained, uncracked hydrocarbon and cracked hydrocarbon. This combination of catalyst and entrained hydrocarbon components is then passed through a stripping means 10. In the stripping means 10, the entrained hydrocarbon components are separated from the catalytic cracking catalyst by a stripping process.

In the stripping process, a stripping fluid is generally supplied to the stripping means 10 by way of a stripping fluid inlet 35–110. The stripping fluid is typically steam or an inert stripping gas. The stripping fluid supplies a positive force that is sufficient to displace the hydrocarbon components into the reaction vessel 5. Any catalytic cracking catalyst fines which may be formed within the reaction system may also be displaced into the reaction vessel 5. Catalyst fines are very small catalyst particles which are formed as a result of typical catalyst wear.

The force exerted by the stripping fluid is such that the flow of the catalytic cracking catalyst toward the catalytic cracking catalyst outlet 115 is not affected. From this outlet, the catalytic cracking catalyst is regenerated and recycled to the riser inlet 95. Any of various methods of regenerating the catalytic cracking catalyst known in the art can be employed.

The hydrocarbon components and any extraneous catalyst fines which are separated in the stripping process can be removed from the reaction vessel 5 by way of an eduction means 30, which is between the slip velocity increasing means 40 and the collection and velocity reducing means 15. The slip velocity increasing means 40 supplies a sufficient force to drive the stripped hydrocarbon components through the eduction means 30 and into the collection and velocity reducing means 15.

In a preferred embodiment, the eduction means 30 is an annulus formed between the slip velocity increasing means 40 and the collection and velocity reducing means 15. As the hydrocarbon components pass through the eduction means 30, the components mix with the reaction stream from the slip velocity increasing means 40 and pass into the collection and velocity reducing means 15, where further cracking takes place.

A positive force can also be supplied outside of the collection and velocity reducing means 15 in order to force the stripped hydrocarbon components through the eduction means 30. In one embodiment, the means for supplying a positive force is a barrier inlet fluid. The barrier inlet fluid is supplied to an upper portion of the reaction vessel by way of a barrier fluid inlet 105. This upper portion of the reaction vessel 5 is generally referred to as a dilute phase zone 90. If any hydrocarbon or catalytic cracking catalyst accumulates in the dilute phase zone 90, undesirable light gas build-up and coke deposits may occur over a period of time. Removal of these undesirable components is generally very difficult. By supplying a barrier fluid within this zone, hydrocarbon as well as any accumulated catalytic cracking catalyst can be forced through the eduction means 30. The barrier fluid can be an inert gas such as nitrogen, or a hydrocarbon compatible stream such as steam, hydrogen, methane or natural gas.

In another embodiment, a solid barrier 20 can also be used to prevent stripped hydrocarbon and catalyst from collecting in the dilute phase zone 90. The solid barrier 20 can be made of various designs such as a membrane or baffle plate. Preferably, the solid barrier 20 is a baffle plate, and the baffle plate can include at least one trap door type of arrangement that is counterweighted to allow vapors to flow upward during times of increasing pressure. At least one trap door can also be arranged to allow vapor such as a steam or gas purge to flow in a downward direction. The baffle plate is preferably maintained above the eduction means 30 to facilitate removal of stripped hydrocarbon and extraneous catalytic cracking catalyst.

In a more preferred embodiment, the baffles will employ counterweighted trap doors. The trap doors will cause pressure to build within the stripping means 30. Upon reaching a predetermined pressure, the trap doors will open, enabling the hydrocarbon and extraneous catalyst to pass into the eduction means 30.

Employing the barrier inlet fluid, the solid barrier, or both, it is preferable that the velocity of the hydrocarbon component stream through the eduction means 30 is about 1–20 ft/sec. More preferably, the velocity will be about 2–10 ft/sec.

FIGS. 2A–C show a few of many possible embodiments for the collection means 15. In FIG. 2A, the collection and velocity reducing means 15 is of a constant cross-sectional area throughout, including the conduit portion 25. The collection and velocity reducing means 15 is formed such that the reaction stream will flow through at the desired velocity. The embodiment of FIG. 2A shows that the inlet of the collection and velocity reducing means 15 can extend below the slip velocity increasing means 40. This will allow the dilute phase zone 90 within the reaction vessel 5 to be maintained below the velocity increasing means 40.

FIG. 2B shows a collection and velocity reducing means 15 having an inlet that is of a larger cross-sectional area than the conduit portion of the collection and velocity reducing means 15. This type of design allows for a decrease in the velocity of the reaction stream due to the expanded cross-sectional area of the inlet of the collection and velocity reducing means 15. In addition, the reduction of the cross-sectional area in the conduit portion of the collection and velocity reducing means 15 allows for greater flexibility in adjusting the residence time of the reaction within the collection and velocity reducing means 15.

FIG. 2C shows a collection and velocity reducing means 15 which is similar to that in FIG. 2A, except that the inlet of the collection and velocity reducing means 15 is slightly above the slip velocity increasing means 40. In this type of design, the eduction means 30 is formed at a relatively elevated position with regard to the slip velocity increasing means 40. This will not only allow for removal of entrained vapors but will allow for relatively easy access during maintenance.

Having now fully described this invention, it will be appreciated by those skilled in the art that the same can be performed within a wide range of equivalent parameters of composition and conditions without departing from the spirit or scope of the invention or any embodiment thereof.

What is claimed is:

1. A catalytic cracking process comprising
providing a feed stream of hydrocarbon and catalytic cracking catalyst;
catalytically cracking the hydrocarbon with the catalytic cracking catalyst to form a reaction stream having a relatively constant velocity, wherein the reaction stream comprises a mixture of hydrocarbon, cracked hydrocarbon and catalytic cracking catalyst;
decreasing the velocity of the hydrocarbon and cracked hydrocarbon relative to the catalytic cracking catalyst within the reaction stream to form a reaction stream having a negative slip velocity;
increasing the velocity of the hydrocarbon and cracked hydrocarbon relative to the catalytic cracking catalyst within the negative slip velocity reaction stream to form a reaction stream having a positive slip velocity;
collecting the positive slip velocity reaction stream;
reducing the velocity of the hydrocarbon and cracked hydrocarbon relative to the catalytic cracking catalyst within the positive slip velocity reaction stream, cracking the hydrocarbon with the catalytic cracking catalyst; and
separating and recovering the cracked hydrocarbon.

2. The process of claim 1, wherein the negative slip velocity is between about negative 10 and negative 50 ft/sec.

3. The process of claim 1, wherein the positive slip velocity is between about 50 and 285 ft/sec.

4. The process of claim 1, wherein the positive slip velocity stream is collected and the slip velocity reduced to achieve a reaction time of about 0.1–3.0 seconds within the collection means.

5. A continuous catalytic cracking process comprising
continuously providing a feed stream which comprises hydrocarbon and catalytic cracking catalyst;
catalytically cracking the hydrocarbon with the catalytic cracking catalyst to form a reaction stream which comprises a mixture of hydrocarbon, cracked hydrocarbon and catalytic cracking catalyst, wherein the reaction stream has a relatively constant velocity;
decreasing the velocity of the hydrocarbon and cracked hydrocarbon relative to the catalytic cracking catalyst within the reaction stream to form a reaction stream having a negative slip velocity;
increasing the velocity of the hydrocarbon and cracked hydrocarbon relative to the catalytic cracking catalyst within the negative slip velocity reaction stream to form a reaction stream having a positive slip velocity;
collecting the positive slip velocity reaction stream;
reducing the velocity of the hydrocarbon and cracked hydrocarbon relative to the catalytic cracking catalyst within the positive slip velocity reaction stream, cracking the hydrocarbon with the catalytic cracking catalyst;
separating and recovering the cracked hydrocarbon;
stripping entrained hydrocarbon from the catalytic cracking catalyst; and
combining the stripped hydrocarbon with the positive slip velocity reaction stream.

6. The process of claim 5, wherein the negative slip velocity is between about negative 10 and negative 50 ft/sec.

7. The process of claim 5, wherein the positive slip velocity is about 50 and 285 ft/sec.

8. The process of claim 5, wherein the positive slip velocity stream is collected and reduced to achieve a reaction time of about 0.1–3.0 seconds within the collection means.

* * * * *